United States Patent [19]

Goldmann et al.

[11] 4,260,370

[45] Apr. 7, 1981

[54] PROCESS FOR THE HEAT-TREATMENT OF FINE GRAINED MATERIAL

[75] Inventors: Wolf Goldmann, Beckum; Wolfgang Rother, Stromberg, both of Fed. Rep. of Germany

[73] Assignee: Krupp Polysius AG, Fed. Rep. of Germany

[21] Appl. No.: 93,700

[22] Filed: Nov. 13, 1979

[30] Foreign Application Priority Data

Dec. 6, 1978 [DE] Fed. Rep. of Germany ....... 2852754

[51] Int. Cl.³ .......................... F27B 15/00; F26B 9/12
[52] U.S. Cl. ..................................... 432/14; 106/100; 432/18; 432/58
[58] Field of Search ....................... 432/14, 15, 18, 58; 106/100; 44/16 A

[56] References Cited

U.S. PATENT DOCUMENTS 4,088,438  5/1978  Deussner et al. ...................... 432/58

Primary Examiner—John J. Camby
Attorney, Agent, or Firm—Learman & McCulloch

[57] ABSTRACT

A process for the heat-treatment of fine-grained material using a multistage cyclone preheater and a revolving tubular kiln, additional fuel being introduced into a stage of the preheater which is selected according to the grain size, reactivity, moisture content, and incombustible constituent content of the fuel so that most of the fuel is almost completely burnt in the lowermost stage of the preheater. In this way, it is possible to obtain a high degree of calcination of the material before it enters the revolving tubular kiln with low preparation costs.

7 Claims, 2 Drawing Figures

PROCESS FOR THE HEAT-TREATMENT OF FINE GRAINED MATERIAL

BACKGROUND OF THE INVENTION

This invention relates to a process for the heat treatment of fine-grained material, particularly cement raw mix, which is preheated with the hot waste gases of a revolving tubular kiln in a multistage cyclone preheater, further heated, particularly calcined, by additional solid fuel, and roasted to completion in the revolving tubular kiln.

In order to relieve the revolving tubular kiln of thermal work and hence reduce its dimensions, it is known that additional fuel may be introduced into the lowermost stage of the preheater so that the material already preheated by the waste kiln gases is further heated (in the particular case of cement raw mix largely calcined) before it subsequently enters the revolving tubular kiln (see German Auslegeschrift No. 2,324,565).

Only a relatively short time is available for transferring the thermal energy present in this additional fuel to the material. Accordingly, it is important in the known process to mix the fuel and the material as quickly and as uniformly as possible in the lowermost stage of the preheater and then to obtain virtually complete combustion of the fuel on or in the immediate vicinity of the material particles.

Where liquid or gaseous fuel is used, no significant problems are involved in meeting the abovementioned requirements. However, this is not the case where solid fuel is used. In order to obtain sufficiently rapid and uniform combustion of the fuel in the lowermost stage of the preheater, the solid fuel has to be dried and very finely ground beforehand which involves considerable costs.

Further difficulties arise where low-quality fuel having a high content of incombustible constituents is used. When fuel of this type is introduced into the lowermost stage of the preheater, a considerable amount of incombustible, cold substances enters the lowermost stage of the preheater as part of the fuel/material mixture and then immediately afterwards the revolving tubular kiln, which seriously impairs the necessary intense calcination of the material before entry into the revolving tubular kiln.

SUMMARY OF THE INVENTION

An object of the present invention is to obviate the difficulties referred to above by providing a process of the kind referred to in such a way that a high degree of calcination of the material is obtained before its entry into the revolving tubular kiln, with particularly low preparation costs for the solid fuel used and with the possibility of using even low-quality fuel. The invention also seeks to create the possibility of optimally adapting the process to different types of fuel.

According to the invention, these objectives are achieved by introducing the additional fuel to the preheater at a zone selected with reference to waste gas temperature and the grain size, reactivity, moisture, and the incombustible constituent content of the fuel in such a way that most of the fuel is almost completely burnt in the lowermost stage of the preheater, i.e., the last stage of the preheater in the direction of movement of the material.

That stage of the preheater into which the additional fuel is introduced is best selected in such a way that at least 90% of the fuel is converted into $CO_2$ in the lowermost stage of the preheater.

The process according to the invention is carried out particularly simply by introducing lump-form solid fuel into the uppermost stage of the preheater, i.e., the first stage in the direction of movement of the material, in merely prebroken and pit-wet form. In this way, the coarse fuel particles are dried and preheated on passing through the individual stages of the preheater so that, finally, they are able to burn virtually completely in the lowermost stage of the preheater. A particularly advantageous side effect is that, as the coarse fuel particles drop through the individual cyclones and pipes of the preheater, they perform a highly desirable cleaning function by dislodging troublesome deposits.

Where a fuel mixture of different particle sizes is used, it is generally best initially to sieve the fuel and to introduce the fine fraction into the lowermost stage and the coarse fraction into a higher stage of the preheater. If for example the fuel is sieved through a 2 mm mesh sieve, the fine fraction is introduced into the lowermost stage and the coarse fraction into the uppermost stage of the preheater. Introducing the fine fraction of the fuel into the lowermost stage of the preheater ensures that this fraction, too, is only burnt in that region (i.e., in the lowermost part of the preheater) where the thermal energy of the fuel is optimally utilized for intense calcination of the material. In addition, the waste gas losses of the preheater are minimized in this way.

Where a fuel having a high content of incombustible constituents is used, this fuel is not introduced into the lowermost stage of the preheater, but instead into a higher stage. In this way, the incombustible constituents are sufficiently preheated by the waste kiln gases before they enter the revolving tubular kiln with the material.

The choice of that stage of the preheater into which the additional fuel is introduced is governed not only by the particle size, moisture and incombustible constituent content of the fuel, but also by the reactivity of the fuel and in particular by the content of volatile combustible constituents in the fuel. The lower this content of volatile combustible constituents, the higher the level in the preheater at which the fuel is generally introduced.

The particle size of the solid fuel may be up to about 50 mm. At least that fraction of the fuel which has a grain size of more than 3 mm is introduced into the uppermost stage of the preheater.

DESCRIPTION OF THE DRAWINGS

One example of an installation for carrying out the process according to the invention is diagrammatically illustrated in the accompanying drawings, wherein.

DETAILED DESCRIPTION OF THE INVENTION

Figure 1:
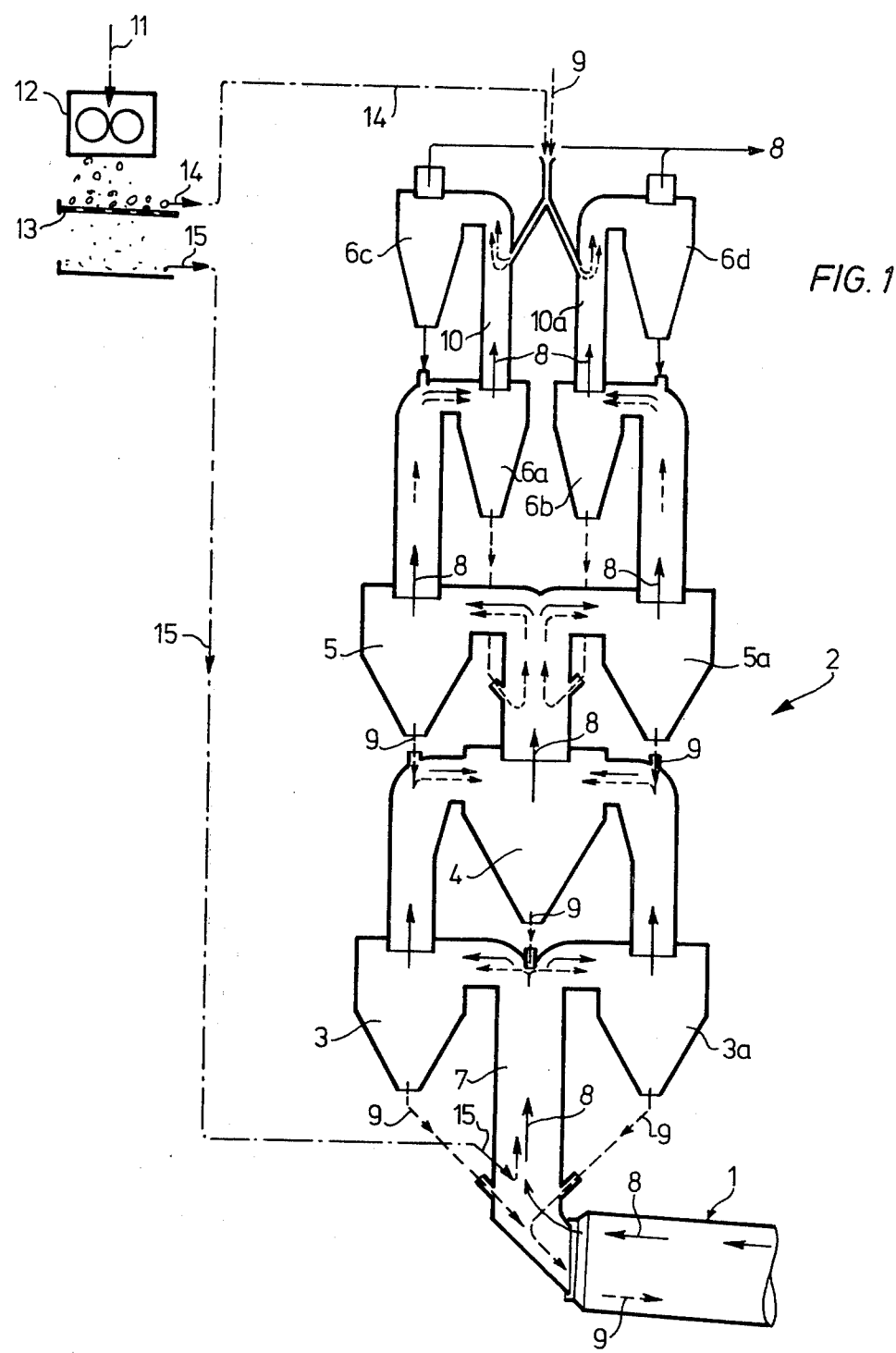
FIG. 1 is an elevational, diagrammatic view of a multistage preheater and furnace.

The illustrated installation for the heat treatment of fine grained-material such as cement raw meal comprises a revolving tubular kiln 1 and a multistage cyclone preheater 2 consisting of a lowermost (first) stage with the cyclones 3, 3a, a second stage with the cylcone 4, a third stage with the cyclones 5, 5a, a fourth stage with the cyclones 6a, 6b and a fifth stage with the cyclones 6c, 6d.

The revolving tubular kiln 1 communicates with the cyclones 3, 3a of the lowermost stage through a gas pipe 7 carrying a stream of waste kiln gases. For the rest, the individual cyclones of the preheater 2 are interconnected by gas and material pipes, as shown in the drawing.

The flow path of the gases is indicated by solid-line arrows 8 and a path which the material follows by chain-line arrows 9.

The material (cement raw meal) is introduced into the gas pipes 10, 10a leading to the cyclones 6c, 6d of the uppermost stage and then passes successively in known manner through the five stages of the preheater 2, being preheated by the waste gases of the revolving tubular kiln 1.

In order to calcine the material as far as possible (removal of the $CO_2$ from the calcium cabonate) before it enters the revolving tubular kiln 1, additional solid fuel is introduced into the gas stream from the revolving tubular kiln 1. In the illustrated embodiment, the lump-form pit-wet fuel (arrow 11) is initially coarsely pre-broken in a breaker 12 and then separated on a sieve 13 into a coarse fraction and a fine fraction. The coarse fraction (arrows 14) passes together with the raw meal as a mix into the gas pipes 10, 10a leading to the cyclones 6c, 6d of the uppermost stage of the preheater. The fine fraction (arrows 15) is introduced into the gas pipe 7 leading from the revolving tubular kiln 1 to the cyclones 3, 3a of the lowermost stage of the preheater.

The coarse fuel particles introduced into the gas stream at the uppermost stage of the preheater pass successively with the material through the individual stages of the preheater, being dried and preheated to such an extent that, finally, they are able to burn virtually completely in the lowermost stage of the preheater together with the fine fraction introduced into the gas stream flowing into that stage.

The invention is further illustrated by the following example:

A raw mix of the following analysis is used:
Raw mix incl. 10% coal
Ignition loss: 34.38%
$SiO_2$: 13.77
$Al_2O_3$: 4.08
$TiO_2$: 0.13
$Fe_2O_3$: 1.98
CaO: 41.31
MgO: 2.81
$SO_3$: 0.57
$P_2O_5$: 0.08
$Na_2$: 0.18
$K_2O$: 0.78
Cl: 0.007
Silicate modulus: 2.22
Alumina modulus: 2.13
Lime standard: 92.7
The analysis of the coal used is as follows:

| Moisture | 0.4% |
| --- | --- |
| Volatile constituents | 5.3% |
| Ash | 68.6% |
| Solid fuel | 25.7% |
| | 100.0% |
| Elemental analysis | |
| Ash | 68.6% |
| C | 25.6% |
| H | 0.6% |
| S | 1.9% |

-continued

| O + N | 3.3% |
| --- | --- |
| | 100.0% |
| Calorific value (Hu) Air-dry | 9285 kJ/kg |

This coal leaves the fine crusher with a particle size of up to 25 mm, around 20% of the particles being smaller than 3 mm.

The chemistry of the raw mix requires 0.155 kg of coal per kg of clinker, of which 0.125 kg of coal/kg of clinker is introduced together with the raw mix and 0.030 kg of coal per kg of clinker into the gas pipe leading from the revolving tubular kiln to the lowermost cyclone stage.

Figure 2:
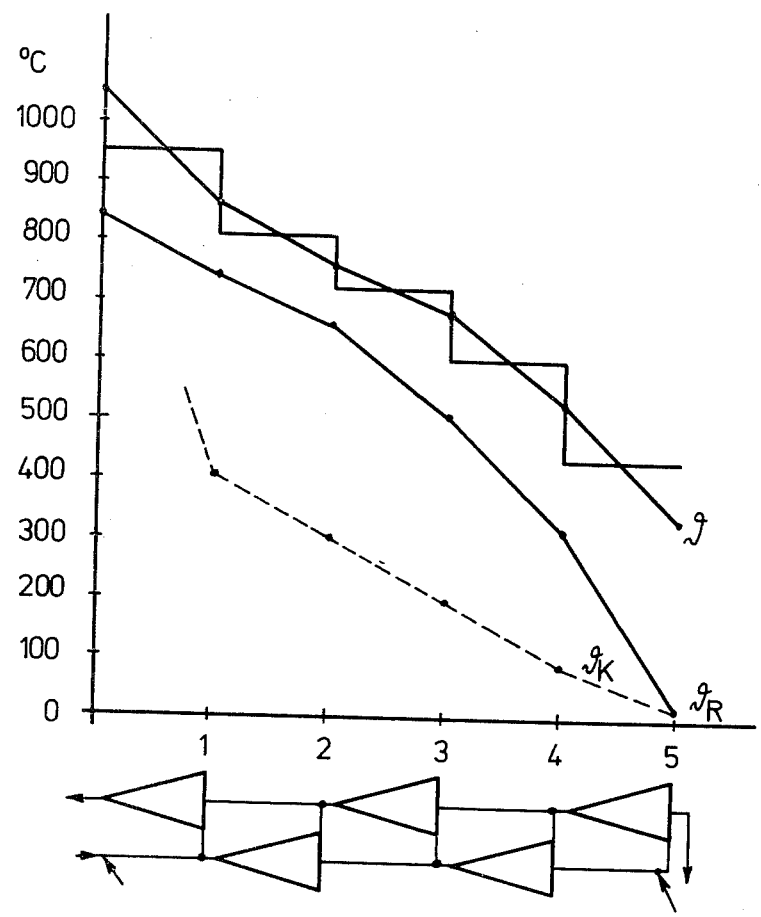
FIG. 2 is a temperature profile of the contents of the several stages of the preheater.

If this raw material and this fuel are introduced into the installation shown in FIG. 1 and if the temperature of the gas ($\theta$gas), the temperature of the raw material ($\theta$R) and the temperature of the coal ($\theta$K) are measured in the five cyclone stages, the temperature profile of the preheater illustrated in FIG. 2 is obtained.

As known from the literature (see for example VDI-Bericht No. 211 (1974), pages 131 et seq.), combustion of the coal is preceded by the elimination of volatile combustible constituents. Where gas-rich coals are used, this elimination process takes place at lower temperatures than where low-gas coal is used.

Accordingly, the fuel may be preheated up to the onset of degassing. Thus, the separation grain size for the divided supply of fuel in the process according to the invention is critically determined by the quality of the fuel. In the case of gas-rich coal, the minimum particle size for the common introduction of the fine fraction with the raw meal is higher than in the case of low-gas coal. In the above example, the separation grain size is 3 mm. For this grain size, therefore, the maximum mean heating temperature in the case of the low-gas coal used in the above example is still considerably below the temperature at which pyrolysis begins.

One significant advantage of preheating part of the fuel lies in the increase in the reactivity of the coal which thus releases the heart required for the calcination process in a shorter reaction time. In the case of the above example, the preheating of the fuel brings a saving in the consumption of heat of up to 80 kJ/kg of clinker. Since the heat used to preheat the fuel comes mostly from the low-temperature end of the process which, besides, cannot be fully utilized in the preheater, a considerable saving of heat is obtained in relation to the conventional procedure where the entire precalcination fuel is introduced in the lowermost stage of the preheater. This is because, in this known process, the heat used to preheat the fuel comes from the high-temperature end of the process. Accordingly, it is missing from the calcination process and has to be restored with an approximately 35% higher calorific value to cover the additional waste gas losses.

Accordingly, the main advantage of the process according to the invention lies in a better utilization of fuel. At the same time, it is possible to obtain the same degree of calcination as in the known process (the degree of calcination is a function of the amount of fuel and the reaction behaviour of the raw material). In the above example with approximate 45% of precalcination fuel, the deacidification level amounts to more than 90%.

We claim:

1. In a process of heat treating fine-grained material such as cement wherein said material passes successively through stages of a vertical, multi-stage cyclone preheater and thence into a kiln from which hot gases flow through said preheater and preheat such material, and wherein additional solid fuel is combusted in the presence of said material, the improvement comprising separating said solid fuel into relatively fine and relatively coarse particles; introducing the relatively fine particles into said preheater at a first selected cyclone stage thereof relatively near said kiln; and introducing the relatively coarse particles into said preheater at a second selected cyclone stage relatively remote from said kiln, said first and second stages being selected with reference to the respective particle size, reactivity, moisture content, and incombustible constituency of said fuel so that the combustion of said relatively coarse and relatively fine particles is substantially complete in the lowermost cyclone stage of said preheater.

2. The process according to claim 1 including introducing said relatively fine particles into said lowermost cyclone stage.

3. The process according to claim 1 including introducing said relatively coarse particles into the uppermost cyclone stage.

4. The process according to claim 1 including separating said relatively coarse and relatively fine particles by sieving.

5. The process according to claim 4 including using a 2 mm. sieve in sieving said particles.

6. The process according to claim 1 including limiting the size of said relatively fine particles to less than about 3 mm.

7. The process according to claim 1 including limiting the size of said relatively coarse particles to between about 3 mm. and 25 mm.

* * * * *

UNITED STATES PATENT AND TRADEMARK OFFICE
CERTIFICATE OF CORRECTION

PATENT NO. : 4,260,370
DATED : April 7, 1981
INVENTOR(S) : Wolf Goldmann et al

It is certified that error appears in the above-identified patent and that said Letters Patent are hereby corrected as shown below:

Column 3, line 52, change "$Na_2$: 0.18" to -- $Na_2O$: 0.18 --

Column 4, line 43, change "heart" to -- heat --.

Signed and Sealed this

Sixteenth Day of June 1981

[SEAL]

Attest:

RENE D. TEGTMEYER

Attesting Officer    Acting Commissioner of Patents and Trademarks